(12) United States Patent
Maruyama et al.

(10) Patent No.: US 10,354,557 B2
(45) Date of Patent: Jul. 16, 2019

(54) ORTHODONTIC PRACTICE APPLIANCE

(71) Applicant: NISSIN DENTAL PRODUCTS INC., Kyoto (JP)

(72) Inventors: Youichi Maruyama, Nagasaki (JP); Teruyuki Iwasaki, Kameoka (JP); Koushirou Matsuo, Kameoka (JP)

(73) Assignee: NISSIN DENTAL PRODUCTS INC., Kyoto (JP)

( * ) Notice: Subject to any disclaimer, the term of this patent is extended or adjusted under 35 U.S.C. 154(b) by 140 days.

(21) Appl. No.: 15/475,321

(22) Filed: Mar. 31, 2017

(65) Prior Publication Data
US 2017/0372637 A1 Dec. 28, 2017

(30) Foreign Application Priority Data

Jun. 23, 2016 (JP) .................................. 2016-124298
Feb. 15, 2017 (JP) .................................. 2017-025962

(51) Int. Cl.
*G09B 23/28* (2006.01)

(52) U.S. Cl.
CPC .................................. *G09B 23/283* (2013.01)

(58) Field of Classification Search
USPC .......... 434/263, 264; 433/54, 57, 58, 59, 61, 433/62, 63, 64, 68
See application file for complete search history.

(56) References Cited

U.S. PATENT DOCUMENTS

| 7,713,063 | B2* | 5/2010 | Lee | G09B 23/283 434/263 |
| 7,713,064 | B2* | 5/2010 | Schulz | G09B 23/283 434/263 |
| 8,277,224 | B2* | 10/2012 | Lee | A61C 11/022 434/263 |
| 8,465,291 | B2* | 6/2013 | Bell | G09B 23/283 434/262 |
| 8,696,361 | B2* | 4/2014 | Woidschutzke | G09B 23/283 434/262 |
| 2008/0220404 | A1* | 9/2008 | Woidschutzke | A61C 11/022 434/263 |
| 2012/0129140 | A1* | 5/2012 | Wren | G09B 23/283 434/263 |
| 2014/0024003 | A1* | 1/2014 | Iwaki | G09B 23/283 434/263 |

FOREIGN PATENT DOCUMENTS

JP H05-027777 U 4/1993

* cited by examiner

*Primary Examiner* — Kurt Fernstrom
(74) *Attorney, Agent, or Firm* — Studebaker & Brackett PC

(57) ABSTRACT

An orthodontic practice appliance (1) in the present invention includes an orthodontic tooth row (23) for orthodontic practice, an orthodontic gingival part (22) that holds the orthodontic tooth row (23) and is softened by the application of heat, and a metal member (24) that is placed inside the orthodontic gingival part (22) and has an exposure portion exposed to the outside. According to the present invention, when the orthodontic practice appliance (1) is immersed in hot water, the exposed metal member (24) is heated. The metal member (24) extends inside the orthodontic gingival part (22). Therefore, the orthodontic gingival part (22) is heated not only from the surface thereof in direct contact with the hot water but also from inside thereof by heat transmitted through the heated metal plate (24). Accordingly, heat is transmitted to the orthodontic gingival part (22) uniformly.

10 Claims, 11 Drawing Sheets

ORTHODONTIC PRACTICE APPLIANCE

This application is based on and claims the benefit of priority from Japanese Patent Application Nos. 2016-124298 and 2017-025962, respectively filed on 23 Jun. 2016 and 15 Feb. 2017, the contents of which are incorporated herein by reference.

BACKGROUND OF THE INVENTION

Field of the Invention

The present invention relates to an orthodontic practice appliance.

Related Art

In dental care, the improvement of occlusion or the correction of dentition has been common recently. As a general method for its treatment, there is a method of applying a dental adhesive to the side of the labial region of each tooth row and attaching an orthodontic appliance (brackets) to the tooth row, and fastening a piece of orthodontic wire to the orthodontic appliance along the tooth row, and gradually improving malocclusion by means of the elasticity of the wire. To master such an advanced treatment technique, it is vital to acquire the technique through practice using an orthodontic practice appliance composed of a dental model before giving an actual patient orthodontic treatment.

As such orthodontic practice appliances, conventionally, there are the following appliances: (1) a wax gingival part is embedded in a cast support part and a metal tooth row is implanted in the gingival part; (2) a wax gingival part is embedded in a resin support part and a resin tooth row is implanted in the gingival part; and (3) a wax gingival part is embedded in a resin support part and a tooth row made of metal and resin is implanted in the gingival part (see Patent Literature 1, etc.). Wire is attached to an orthodontic tooth row of such an orthodontic practice appliance, and is immersed in hot water, thereby the wax gingival part is softened. Then, the orthodontic tooth row with the wire attached can be moved and is corrected. In practice, this movement of the orthodontic tooth row can be observed.

However, the appliance (1) has a high manufacturing cost. Furthermore, excessive heat is transmitted to the metal tooth row, and softening of wax around the tooth row is faster than the other areas, and the tooth row may come out. The resin tooth row of the appliance (2) is poor in thermal conductance, and when the appliance is immersed in hot water with the aim to softening the wax, the surface of the wax is softened before the inside of the wax. Accordingly, the reproducibility of the smooth movement of the tooth row is low, and the practice effect is low. The appliance (3) has a lower manufacturing cost than the appliance (1); however, since metal is used in the tooth row, the appliance (3) is still costly.

Patent Document 1: Japanese unexamined utility model application, publication No. H05-27777

SUMMARY OF THE INVENTION

The present invention is intended to provide an orthodontic practice appliance that can be manufactured inexpensively and is improved in terms of the temperature uniformity of the wax gingival part when heated.

The present invention relates to an orthodontic practice appliance that includes an orthodontic tooth row for orthodontic practice, an orthodontic gingival part that holds the orthodontic tooth row and is softened by application of heat, and a metal member that is placed inside the orthodontic gingival part and has an exposure portion exposed to the outside.

It is preferable that the metal member extends in a direction parallel to the orthodontic tooth row.

It is preferable that the orthodontic practice appliance further includes a support part that supports the orthodontic gingival part.

The orthodontic tooth row, the orthodontic gingival part, and the metal member can be configured to be removably attached to the support part.

It is preferable that the metal member is placed to be along the arch of the orthodontic tooth row.

It is preferable that the metal member extends from the exposure portion to near a root part of the orthodontic tooth row.

The width of the metal member can be configured to vary according to the length of the root part.

The metal member can be configured to include two or more plate parts extending in a direction parallel to the orthodontic tooth row with a space with a predetermined width left between the plate parts.

The two or more plate parts can be formed by folding a sheet of a plate member into a U-shape.

The orthodontic practice appliance can be an orthodontic practice appliance used when orthodontic correction is performed on part of a tooth row; and the metal member can be placed only on a portion corresponding to the tooth row subjected to the orthodontic correction.

The orthodontic practice appliance can be an orthodontic practice appliance used when orthodontic correction is performed on part of a tooth row; the metal member can be placed to be along the entire tooth row; and the width of a portion corresponding to a tooth row not subjected to the orthodontic correction can be narrower than that of a portion corresponding to a tooth row subjected to the orthodontic correction.

According to the present invention, it is possible to provide an orthodontic practice appliance that can be manufactured inexpensively and is improved in terms of temperature uniformity of the wax orthodontic gingival part when heated.

DETAILED DESCRIPTION OF THE INVENTION

First Embodiment

Figure 1:
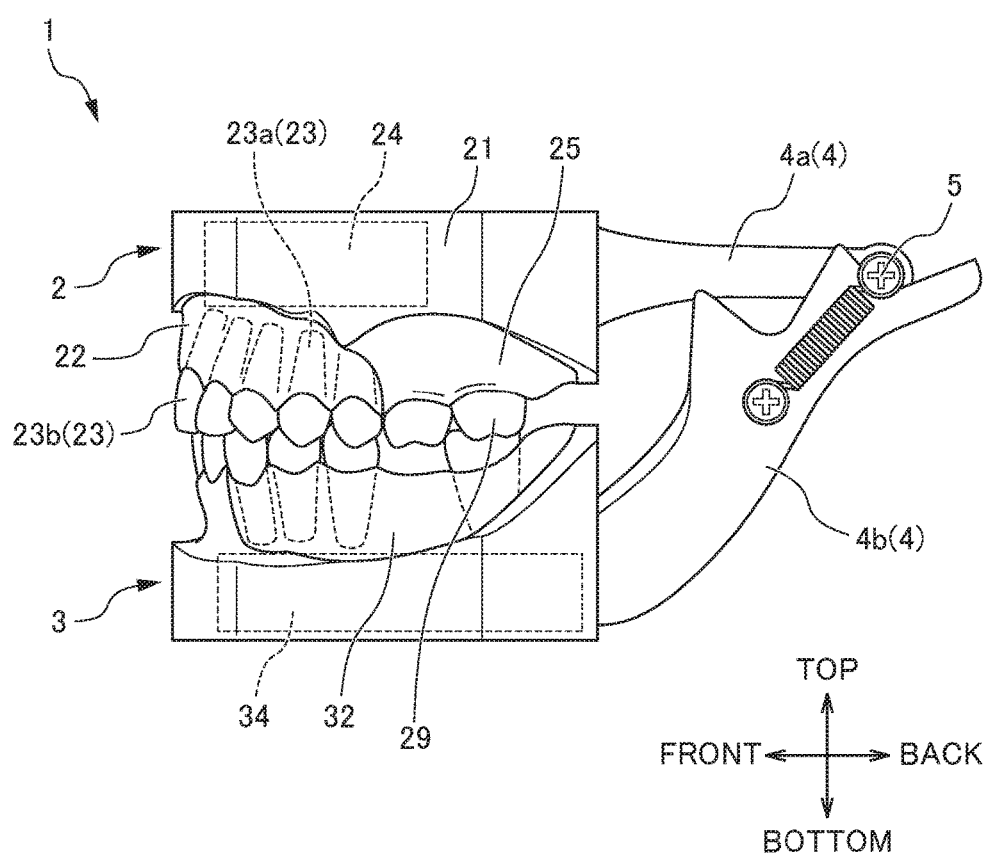
FIG. 1 is a side view of an orthodontic practice appliance according to a first embodiment.

A first embodiment of the present invention is described below. FIG. 1 is a side view of an orthodontic practice appliance 1. As shown in FIG. 1, the orthodontic practice appliance 1 according to the present embodiment includes an upper orthodontic practice appliance 2 and a lower orthodontic practice appliance 3. However, the orthodontic practice appliance 1 in the present invention is not limited to this and can be configured to include either the upper orthodontic practice appliance 2 or the lower orthodontic practice appliance 3. However, for performing the practice under conditions close to the case of treatment of an actual living body; like the present embodiment, the orthodontic practice appliance 1 is preferably an integrated combination of both the upper orthodontic practice appliance 2 and the lower orthodontic practice appliance 3.

The upper orthodontic practice appliance 2 and the lower orthodontic practice appliance 3 are each held by a metal holding frame 4 (an upper holding frame 4a and a lower holding frame 4b, respectively). The upper holding frame 4a and the lower holding frame 4b are pivotably supported by a horizontal axle 5 provided in the rear of them so that they both can be opened and closed around the horizontal axle 5. In the present application, as shown in the drawings, the front tooth side in the orthodontic practice appliance 1 is referred to as the front; the back tooth side is referred to as the back; the upper tooth side is referred to as the top; the lower tooth side is referred to as the bottom; the right side as one faces the orthodontic practice appliance 1 is referred to as the right; and the left side as one faces the orthodontic practice appliance 1 is referred to as the left.

Figure 2:
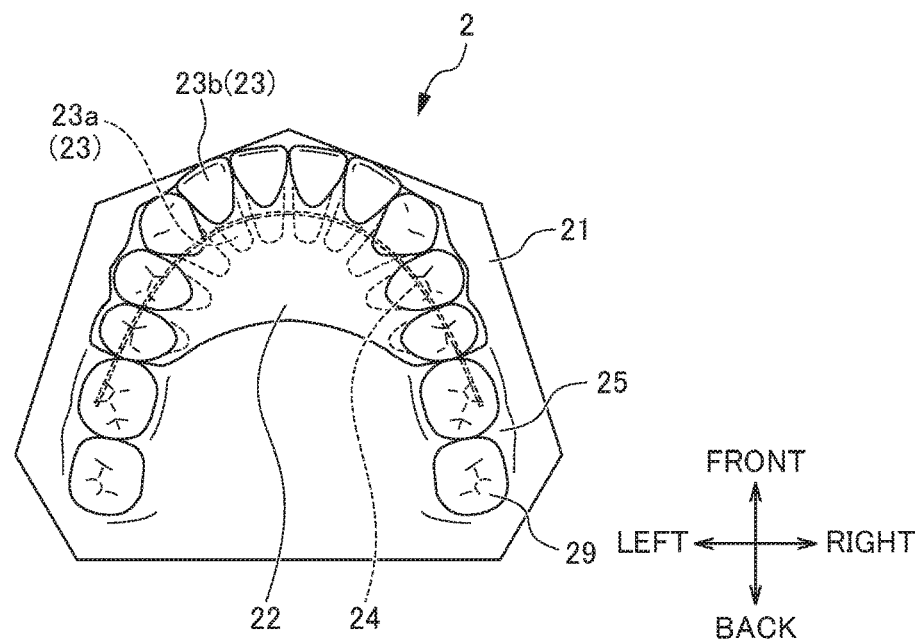
FIG. 2 is a bottom view of the upper orthodontic practice appliance.
Figure 3:
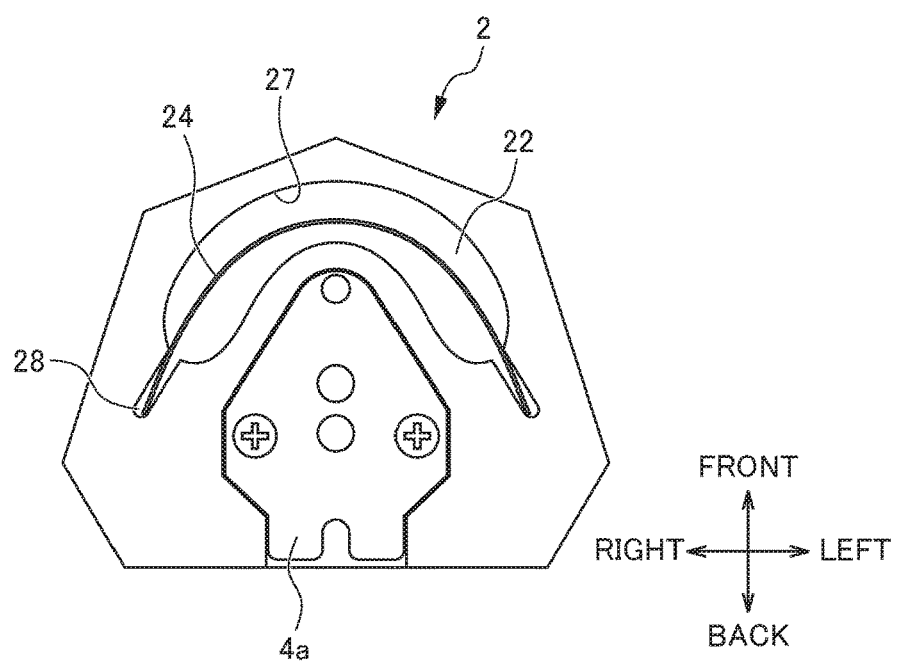
FIG. 3 is a top view of the upper orthodontic practice appliance.
Figure 4:
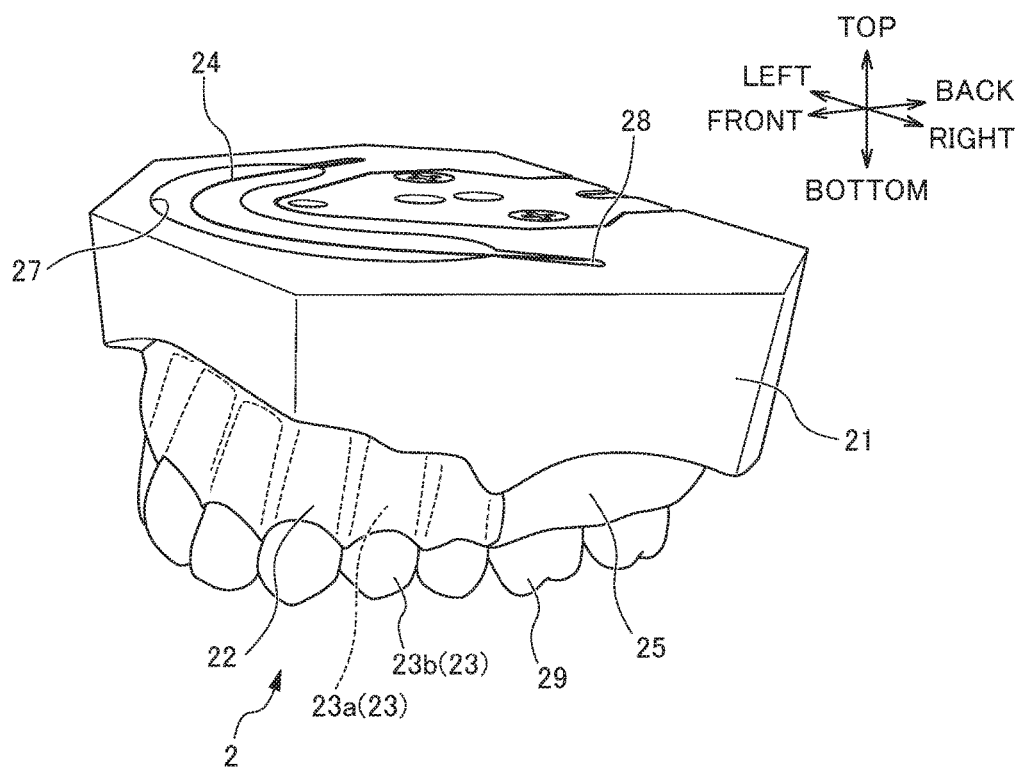
FIG. 4 is a perspective view of the upper orthodontic practice appliance.
Figure 5:
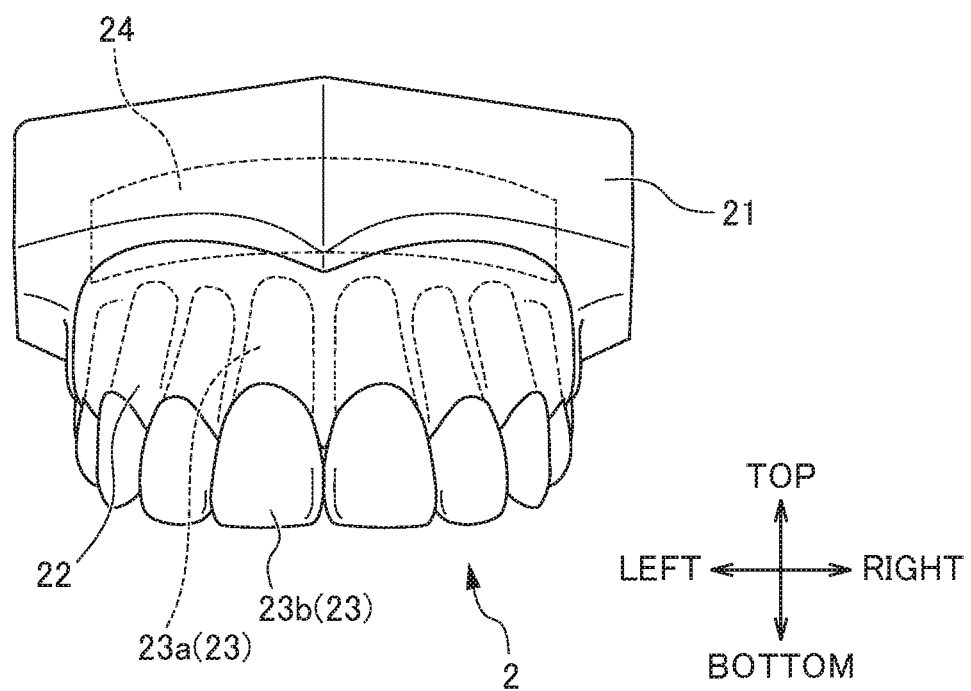
FIG. 5 is a front view of the upper orthodontic practice appliance.

First, the upper orthodontic practice appliance 2 is described. FIG. 2 is a bottom view of the upper orthodontic practice appliance 2; FIG. 3 is a top view of the upper orthodontic practice appliance 2; FIG. 4 is a perspective view of the upper orthodontic practice appliance 2; and FIG. 5 is a front view of the upper orthodontic practice appliance 2. The upper orthodontic practice appliance 2 includes a support part 21, a wax orthodontic gingival part 22 of which the upper portion is embedded in the support part 21, an orthodontic tooth row 23 implanted in the orthodontic gingival part 22, and a metal plate 24 as a metal member placed inside the orthodontic gingival part 22.

The orthodontic tooth row 23 in the present embodiment is, as shown in FIG. 2, the front ten teeth of an entire tooth row. However, the orthodontic tooth row 23 is not limited to this; the orthodontic tooth row 23 can be the entire tooth row, or can be ten or less teeth, for example, one tooth. In the lower orthodontic practice appliance 3 to be described below, a row of multiple teeth including a back tooth on the observers' right is the orthodontic tooth row 33.

The support part 21 is a resin member that supports the orthodontic gingival part 22. The above-mentioned metal upper holding frame 4a shown in FIGS. 1 and 3 is attached to the support part 21. The support part 21 is integrally molded with a gingival part 25 other than the orthodontic gingival part 22 in the mouth and a tooth row 29 other than the orthodontic tooth row 23 as well. An opening 27 in which the orthodontic gingival part 22 is embedded is formed on the support part 21. The opening 27 is formed so as to penetrate through the support part 21 vertically, and, as shown in FIG. 4 most clearly, is located above the orthodontic gingival part 22. As shown in FIG. 3, the opening 27 is formed into a U-shape along the arch of the orthodontic tooth row 23, and narrow portions 28 that are narrower in width are formed on both ends of the opening 27, respectively.

As described above, the upper portion of the orthodontic gingival part 22 is embedded in the opening 27 formed on the support part 21, and a lower portion of the orthodontic gingival part 22 extends downward from the support part 21. Then, the top end of the orthodontic gingival part 22 is exposed on the upper surface side of the support part 21.

The orthodontic gingival part 22 is manufactured in a different color from the support part 21 so that they can be distinguished by color. For example, in the present embodiment, the support part 21 is manufactured in cream color, and the orthodontic gingival part 22 is manufactured in red color. The orthodontic gingival part 22 is made of wax material. Commercially available wax material can be widely used as the wax material. However, if wax material with a softening point at 35° C. or lower is used, the wax material is easily softened, and yet is less likely to be solidified even when the supply of heat has been cut off after the correction of the tooth row. On the contrary, if wax material with a softening point at 85° C. or higher is used, a large quantity of heat is required to soften the wax material. Therefore, it is preferable to use wax material with a softening point at a temperature between 35 to 85° C., more preferably between 40 to 45° C.

The orthodontic tooth row 23 implanted in the orthodontic gingival part 22 has a root part 23a and a crown part 23b. The root part 23a is embedded in the orthodontic gingival part 22. The crown part 23b extends downward from the orthodontic gingival part 22, and is exposed to the outside of the orthodontic gingival part 22. The material of the orthodontic tooth row 23 is not particularly limited, and general synthetic resin can be widely used.

The metal plate 24 as a metal member is embedded above the orthodontic gingival part 22. The material of the metal plate 24 is, for example, copper plate having good thermal conductivity. The metal plate 24 extends in a curve along the arch of the tooth row. Then, one end of the long side of the metal plate 24 is placed in one of the narrow portions 28 on the opening 27 of the support part 21 and extends inside the opening 27, and the other end is placed in the other narrow portion 28 on the opening 27 of the support part 21. In this way, both ends of the metal plate 24 are held by the narrow portions 28 that are narrower in width; therefore, the metal plate 24 is kept in the curved shape.

The short side of the metal plate 24 extends inside the orthodontic gingival part 22 from the top end of the orthodontic gingival part 22 toward the side of the root part 23a of the orthodontic tooth row 23. However, as shown in FIG. 5, the metal plate 24 is not in contact with the root part 23a, and is kept at a predetermined distance from the root part 23a. Furthermore, the top end of the metal plate 24 is not embedded in the orthodontic gingival part 22 and is exposed to the outside. As shown in FIGS. 3 and 4, in the present embodiment, the entire length of the top end of the metal plate 24 is exposed to the outside; however, the exposure of the top end of the metal plate 24 is not limited to this. It is preferable that the entire length of the top end of the metal plate 24 is exposed; however, the top end of the metal plate 24 can be configured to be partially exposed.

Figure 6:
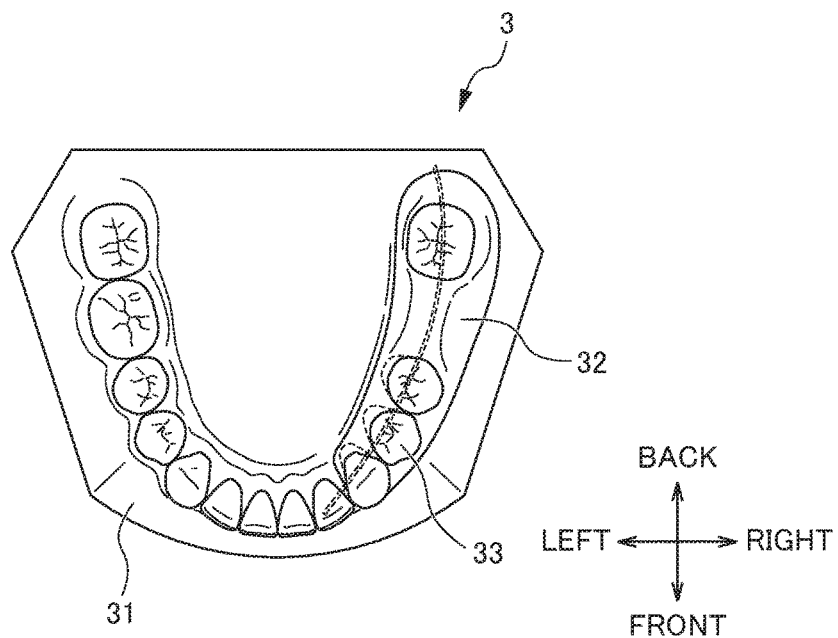
FIG. 6 is a bottom view of a lower orthodontic practice appliance.
Figure 7:
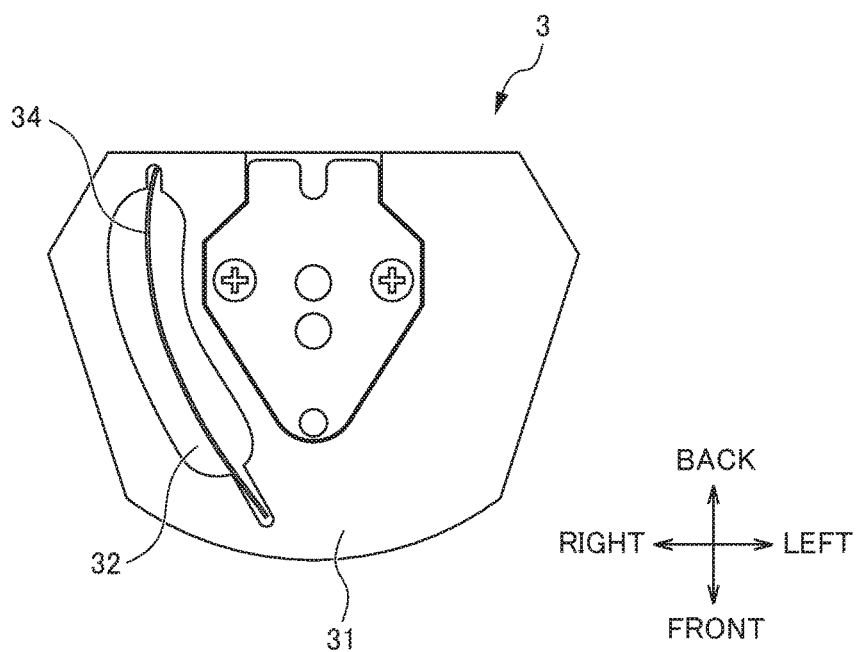
FIG. 7 is a top view of the lower orthodontic practice appliance.

Subsequently, the lower orthodontic practice appliance 3 is described. FIG. 6 is a bottom view of the lower orthodontic practice appliance 3, and FIG. 7 is a top view of the lower orthodontic practice appliance 3. The lower orthodontic practice appliance 3 also includes, like the upper orthodontic practice appliance 2, a support part 31, an orthodontic gingival part 32 embedded in the support part 31, an orthodontic tooth row 33 held by the orthodontic gingival part 32, and a metal plate 34 placed inside the orthodontic gingival part 32. The difference between the lower orthodontic practice appliance 3 and the upper orthodontic practice appliance 2 is the position of the orthodontic tooth row 33; as shown in FIG. 6, a row of multiple teeth including a back tooth on the observers' right is the orthodontic tooth row 33. The other parts are similar to those of the upper orthodontic practice appliance 2, so a description of them is omitted.

Subsequently, the procedure of how to perform practice using the orthodontic practice appliance 1 is described. At the time of manufacture, the orthodontic practice appliance 1 is secured so that the implant positions and directions of the orthodontic tooth rows 23 and 33 to be corrected are shifted from the correct positions and directions according to the contents of an orthodontic practice. The positions and directions of the orthodontic tooth rows 23 and 33 can be shifted when the orthodontic tooth rows 23 and 33 are implanted, or can be shifted by applying heat to the orthodontic gingival part 22 after the orthodontic tooth rows 23 and 33 have been implanted.

First, an adhesive is applied to each support part 21, 31 that is a labial or buccal region of the orthodontic practice appliance 1, and an orthodontic appliance is attached to the support part, and then orthodontic wire (not shown) is fastened to the orthodontic appliance along the tooth row.

After that, the entire orthodontic practice appliance 1 is immersed in hot water at a temperature of 35 to 60° C. After the entire orthodontic practice appliance 1 is left in the hot water for a while, the orthodontic gingival parts 22 and 32 securing the orthodontic tooth rows 23 and 33 are softened. When the orthodontic gingival parts 22 and 32 have been softened, the positions of the orthodontic tooth rows 23 and 33 are moved by the tensile force of the wires. At the point when the positions of the orthodontic tooth rows 23 and 33 have been moved and the correction is complete, the entire orthodontic practice appliance 1 is taken out of the hot water, and is cooled with cold water or cooling air to solidify the orthodontic gingival parts 22 and 32. According to the present embodiment, a practicing person can observe how the orthodontic tooth rows 23 and 33 have been moved and determine whether the treatment has been done properly or not.

According to the present embodiment, the top ends of the metal plates 24 and 34 are exposed to the outside. When the entire orthodontic practice appliance 1 is immersed in hot water, the metal plates 24 and 34 are heated. The metal plates 24 and 34 extend inside the orthodontic gingival parts 22 and 32, respectively. Therefore, the orthodontic gingival parts 22 and 32 are heated not only from the surfaces thereof in direct contact with the hot water but also from inside thereof by heat transmitted through the heated metal plates 24 and 34. Accordingly, heat is transmitted to the entire orthodontic gingival parts 22 and 32 uniformly as compared with the case where only the surfaces of the orthodontic gingival parts 22 and 32 are in contact with hot water. So, the orthodontic gingival parts 22 and 32 are less likely to have the uneven softness, and the tooth rows can be held in a condition closer to the actual gingiva. Therefore, a better practice effect can be achieved.

Furthermore, by placing the metal plates 24 and 34 at intended positions, only the intended portion of a gingival part can be softened, and the movement of teeth can be brought closer to that in an actual living body.

Second Embodiment

Figure 8:
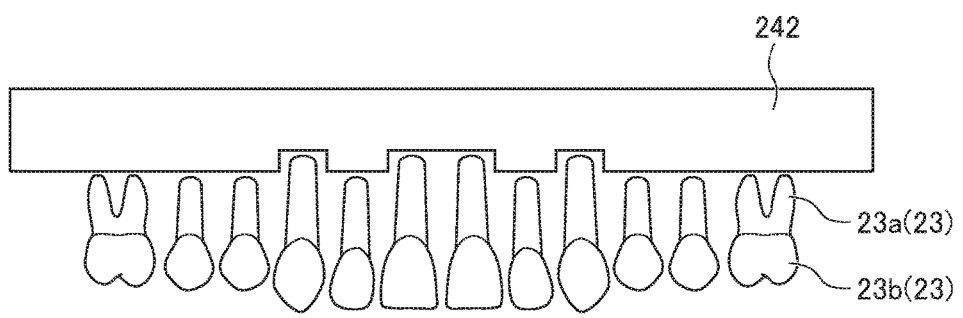
FIG. 8 is a diagram illustrating a metal plate in a second embodiment.

The metal plate 24 in the first embodiment has uniform width; however, the width of the metal plate 24 is not limited to this. FIG. 8 is a diagram illustrating a metal plate 242 in a second embodiment. In the second embodiment, the width of the short side of the metal plate 242 is not uniform, and varies according to the length (height) of the root part 23a of the orthodontic tooth row 23. The other configurations are the same as the first embodiment, so a description of the same parts is omitted. Furthermore, the metal plate 242 placed in an upper orthodontic practice appliance is described in the present embodiment; however, the same is true for a metal plate placed in a lower orthodontic practice appliance. The length of the root part 23a in the tooth row is not constant, and varies in some portions. In the second embodiment, the width of the metal plate 242 is changed so that the distance between the root part 23a and the metal plate 242 is kept constant according to the length of the root part 23a. By changing the width of the metal plate 242 in this way, the temperature (the degree of softening) around the root part 23a of the orthodontic gingival part 22 can be kept constant regardless of the length of the root part 23a.

Third Embodiment

Figure 9:
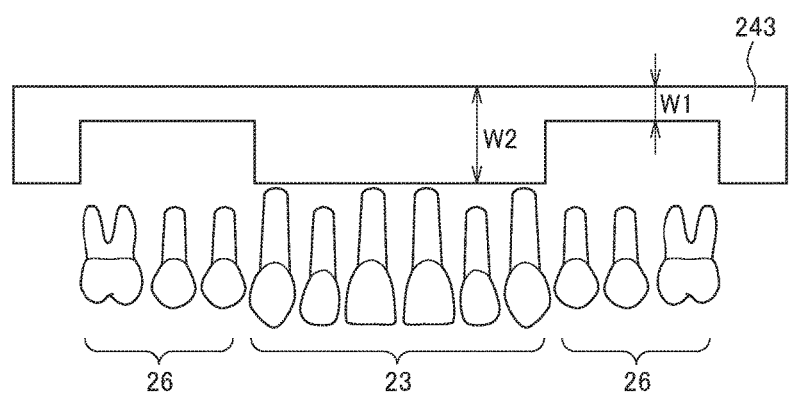
FIG. 9 is a diagram illustrating a metal plate in a third embodiment.

FIG. 9 is a diagram illustrating a metal plate 243 in a third embodiment. The orthodontic practice appliance in the third embodiment is an orthodontic practice appliance used when orthodontic correction is performed on part of a tooth row. In the third embodiment, the metal plate 243 is placed so as to be along the entire tooth row; however, the width W1 of the portion corresponding to the tooth row 26 not subjected to orthodontic correction is narrower than the width W2 of a portion corresponding to a tooth row 23 subjected to orthodontic correction. The other configurations are the same as the first embodiment, so a description of the same parts is omitted. The metal plate 243 is heated when the orthodontic practice appliance is immersed in hot water. The metal plate 243 extends inside an orthodontic gingival part. Therefore, the orthodontic gingival part is heated not only from the surface thereof in direct contact with the hot water but also from inside thereof by heat transmitted through the heated metal plate 243. However, according to the present embodiment, the width W1 of the metal plate 243 of the portion corresponding to the tooth row 26 not subjected to orthodontic correction is narrow, so heat is less likely to be transmitted to this portion of the orthodontic gingival part, and the tooth row 26 is less likely to be moved. Therefore, it is possible to perform the orthodontic practice on the tooth row 23 only. In the above description, the case is described where the orthodontic practice is not performed on the tooth row 26 corresponding to the narrow width W1 of the metal plate 243; however, the configuration is not limited to this. The amount of movement of the tooth row 26 can be adjusted by changing the distance between the tooth row 26 and the metal plate 243. That is, the amount of movement of the tooth row 26 is increased with decreasing distance between the tooth row 26 and the metal plate 243, and the amount of movement of the tooth row 26 is decreased with increasing distance between the tooth row 26 and the metal plate 243.

Fourth Embodiment

Figure 10:
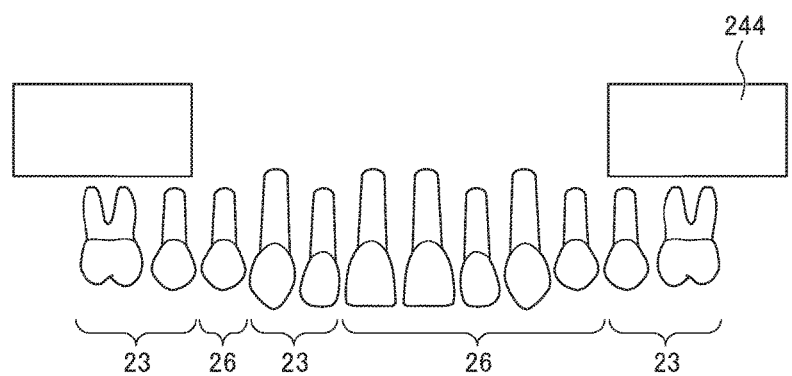
FIG. 10 is a diagram illustrating a metal plate in a fourth embodiment.

FIG. 10 is a diagram illustrating a metal plate 244 in a fourth embodiment. The orthodontic practice appliance in the fourth embodiment is also an orthodontic practice appliance used when orthodontic correction is performed on part of a tooth row. In the fourth embodiment, the metal plate 244 is placed only on the portion corresponding to the tooth row 23 subjected to the orthodontic correction, and is not placed on the portion corresponding to the tooth row 26 not subjected to the orthodontic correction. That is, the metal plates 244 are placed intermittently. The other configurations are the same as the first embodiment, so a description of the same parts is omitted. Also in the present embodiment, the metal plate 244 is heated when the orthodontic practice appliance is immersed in hot water. The metal plate 244 extends inside an orthodontic gingival part. Therefore, the orthodontic gingival part is heated not only from the surface thereof in direct contact with the hot water but also from inside thereof by heat transmitted through the heated metal plate 244. However, according to the present embodiment, no metal plates 244 are placed on the portions corresponding to the tooth rows 26 not subjected to the orthodontic correction; therefore, these portions of the orthodontic gingival part have no heat conduction from the metal plates 244, and the tooth rows 26 are less likely to be moved. Therefore, it is possible to perform the orthodontic practice on the tooth rows 23 only. The metal member does not have to be a plate-like member; for example, the metal member can be a rod-like member. Furthermore, in FIG. 10, the metal plates 244 are placed at positions where the narrow portions 28 shown in FIG. 3 can hold the metal plates 244 to prevent the movement of the metal plates 244 at the time of manufacture.

Fifth Embodiment

Figure 11:
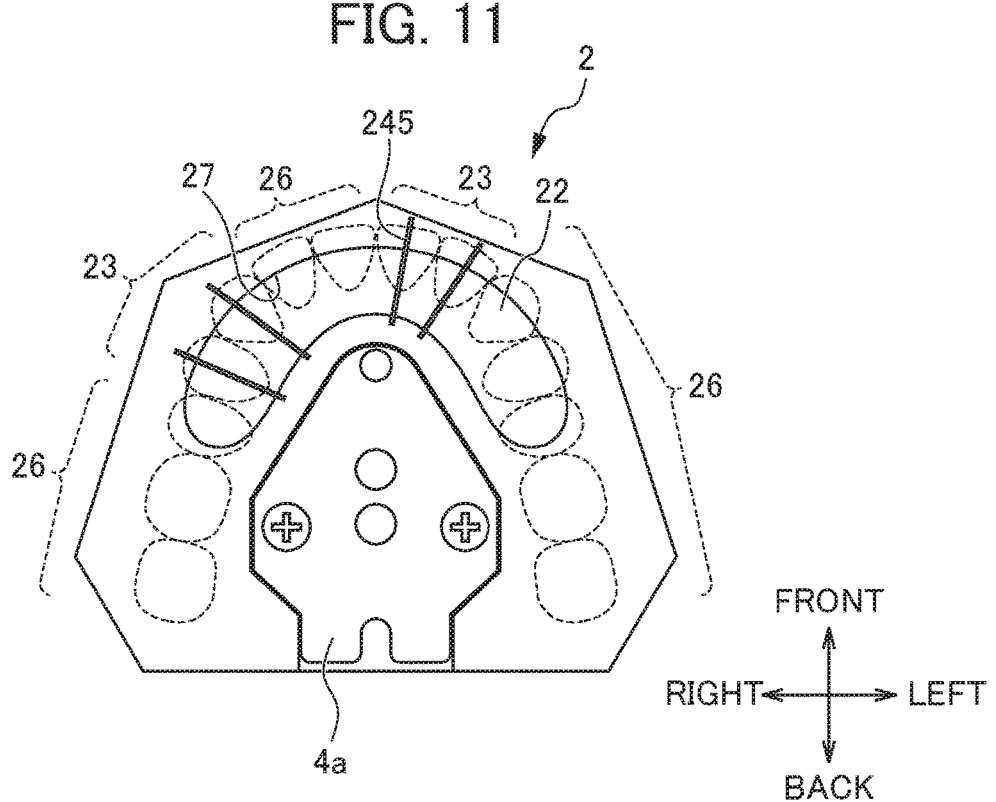
FIG. 11 is a diagram illustrating a metal plate in a fifth embodiment.

FIG. 11 is a diagram illustrating a metal plate 245 in a fifth embodiment. The orthodontic practice appliance in the fifth embodiment is also an orthodontic practice appliance used when orthodontic correction is performed on part of a tooth row. In the fifth embodiment, the metal plate 245 is placed only on the portion corresponding to the tooth row 23 subjected to the orthodontic correction, and is not placed on the portion corresponding to the tooth row 26 not subjected to the orthodontic correction, like the fourth embodiment. However, unlike the fourth embodiment, the metal plate 245 extends in a direction perpendicular to the tooth row 23. The other configurations are the same as the first embodiment, so a description of the same parts is omitted. Also in the present embodiment, the metal plate 245 is heated when the orthodontic practice appliance is immersed in hot water. The metal plate 245 extends inside the orthodontic gingival part 22. Therefore, the orthodontic gingival part 22 is heated not only from the surface thereof in direct contact with the hot water but also from inside thereof by heat transmitted through the heated metal plate 245.

Sixth Embodiment

Figure 12:
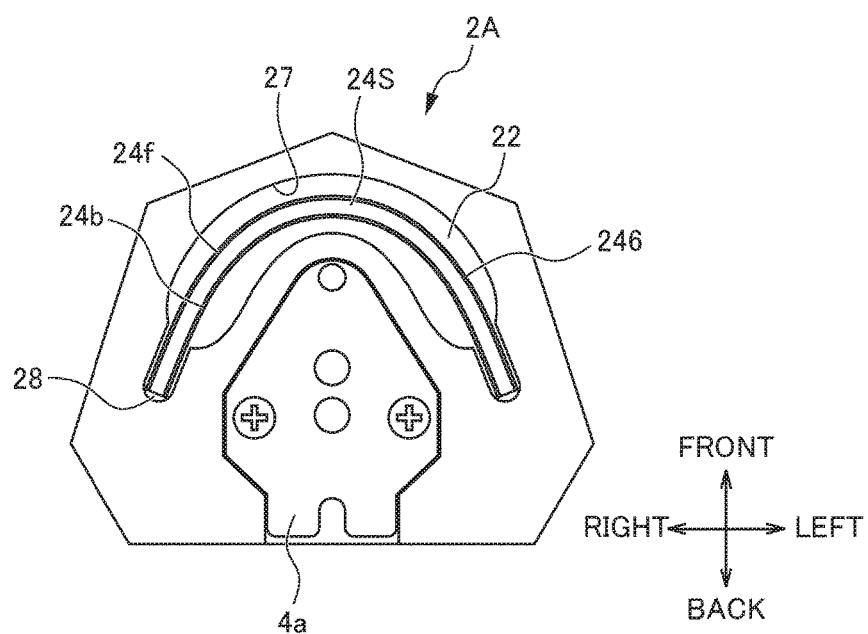
FIG. 12 is a diagram illustrating an upper orthodontic practice appliance in a sixth embodiment.
Figure 13:
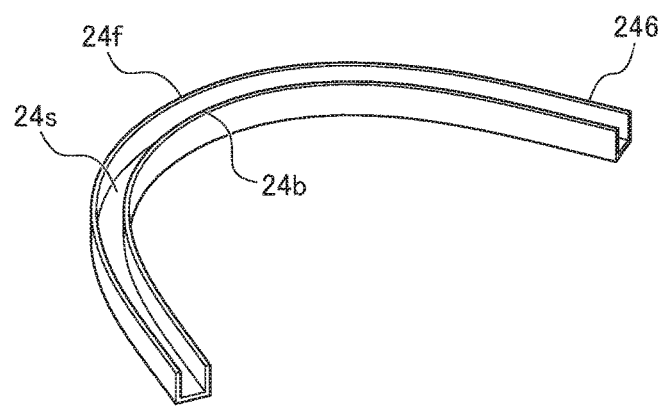
FIG. 13 is a diagram illustrating a metal plate in the sixth embodiment.

FIG. 12 is a diagram illustrating an upper orthodontic practice appliance 2A in a sixth embodiment. FIG. 13 is a diagram illustrating the metal plate 246 in the sixth embodiment. As shown in FIG. 13, the metal plate 246 as a metal member has a U-shape in cross-section. The other configurations are the same as the first embodiment, so a description of the same parts is omitted. The metal plate 246 is formed in such a manner that a sheet of metal plate is folded into a U-shape in cross-section and then is curved along a tooth row. One folded portion (the front portion 24f) and the other folded portion (the back portion 24b) have a double-walled structure extending in the direction along the tooth row while keeping a parallel separation relationship. No material that is the orthodontic gingival part 22 is placed in the space 24s between the front portion 24f and the back portion 24b, and the metal plate 246 is exposed. Therefore, when the upper orthodontic practice appliance 2A is immersed in hot water, the hot water enters the space 24s between the front portion 24f and the back portion 24b as well, so the heat conduction to the metal plate 246 becomes better.

Seventh Embodiment

Figure 14:
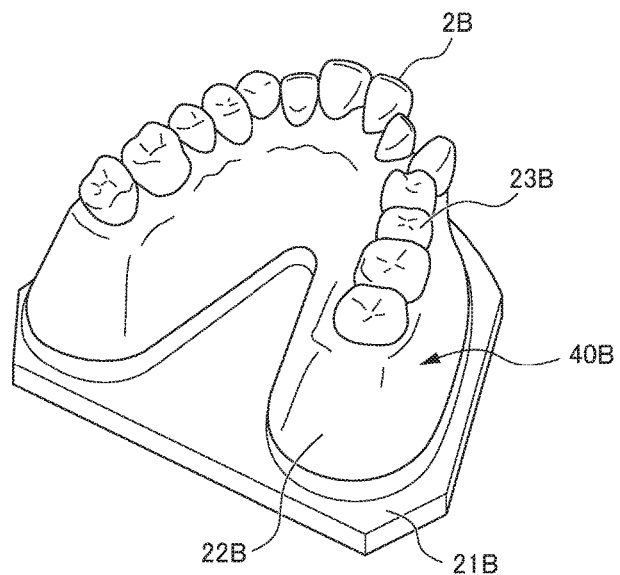
FIG. 14 is a perspective view of an upper orthodontic practice appliance in a seventh embodiment viewed from below.
Figure 15:
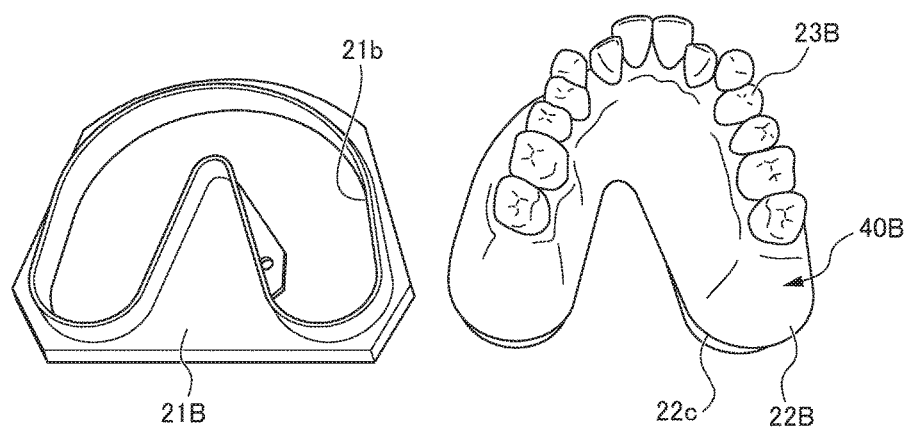
FIG. 15 shows a state where an orthodontic practice unit is separated from a support part in the seventh embodiment.
Figure 16:
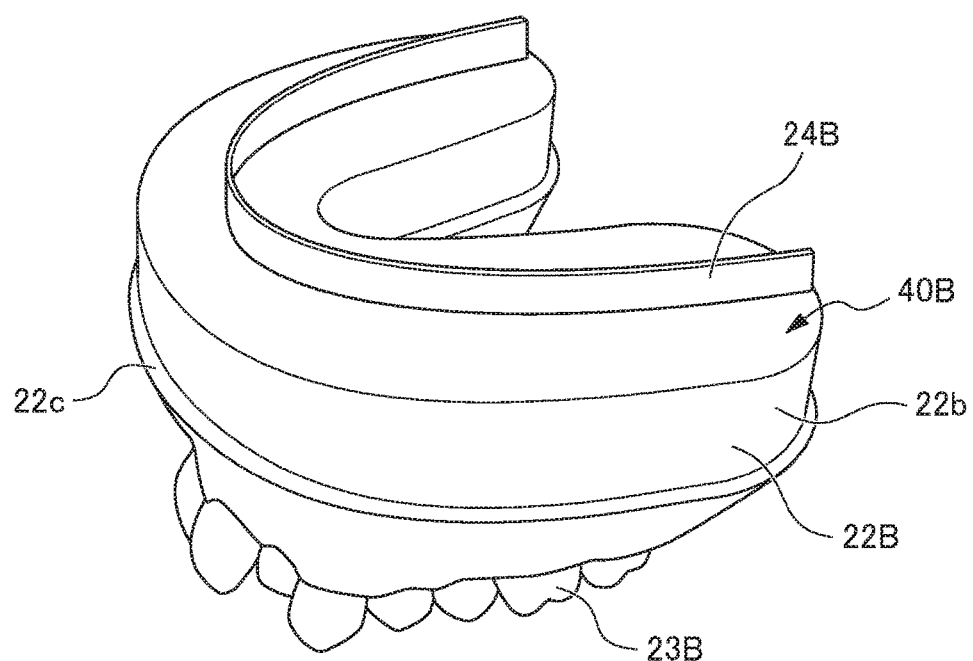
FIG. 16 is a perspective view of the orthodontic practice unit in the seventh embodiment.

FIG. 14 is a perspective view of an upper orthodontic practice appliance 2B in a seventh embodiment viewed from below. The orthodontic practice appliance in the seventh embodiment differs from the first embodiment in that in the upper orthodontic practice appliance 2B, an orthodontic practice unit 40B into which an orthodontic gingival part 22B, an orthodontic tooth row 23B implanted in the orthodontic gingival part 22B, and a metal plate 24B placed inside the orthodontic gingival part 22B are integrated is removably attached to a support part 21B. FIG. 15 shows the state where the orthodontic practice unit 40B is separated from the support part 21B. FIG. 16 is a perspective view of the orthodontic practice unit 40B. As shown in the drawings, in the present embodiment, the metal plate 24B projects from the orthodontic gingival part 22B.

In the seventh embodiment, the configuration is described where in the upper orthodontic practice appliance 2B, the orthodontic practice unit 40B into which the orthodontic gingival part 22B, the orthodontic tooth row 23B implanted in the orthodontic gingival part 22B, and the metal plate 24B placed inside the orthodontic gingival part 22B are integrated is removably attached to the support part 21B; however, the configuration is not limited to this. Alternatively, it can be configured that in a lower orthodontic practice appliance, a lower orthodontic practice unit into which an orthodontic gingival part, an orthodontic tooth row implanted in the orthodontic gingival part, and a metal plate placed inside the orthodontic gingival part are integrated is removably attached to a support part. Furthermore, in the seventh embodiment, the orthodontic tooth row 23B is an entire tooth row; however, the orthodontic tooth row 23B is not limited to this, and can be part of a tooth row, like the other embodiments.

As shown in FIG. 15, the support part 21B is provided with an opening 21b into which the orthodontic practice unit 40B is inserted. On the other hand, as shown in FIGS. 15 and 16, on the side of the orthodontic gingival part 22B of the orthodontic practice unit 40B, an insertion part 22b having a shape matching the shape of the opening 21b of the support part 21B is provided. On the side of the orthodontic gingival part 22B closer to the orthodontic tooth row 23B than the insertion part 22b, a tiered part 22c is provided. When the insertion part 22b of the orthodontic gingival part 22B is inserted into the opening 21b of the support part 21B, excessive insertion of the orthodontic practice unit 40B into the support part 21B is prevented by the tiered part 22c, and the position of the orthodontic practice unit 40B with respect to the support part 21B is secured.

When practice is performed using the upper orthodontic practice appliance 2B in the present embodiment, as described in the first embodiment, the orthodontic tooth row 23B is moved to the orthodontic gingival part 22B. Accordingly, a practicing person can observe how the orthodontic tooth row 23B has been moved and determine whether the treatment has been done properly or not. However, the orthodontic practice unit 40B used in practice once is not appropriate for reuse because the orthodontic tooth row 23B has been moved. According to the present embodiment, as the orthodontic practice unit 40B of the upper orthodontic practice appliance 2B is removably attached to the support part 21B, it is possible to reuse the support part 21B by replacing only the orthodontic practice unit 40B with a new one. Therefore, practice can be performed more inexpensively than in the case where the entire upper orthodontic practice appliance 2B is replaced on the occasion of each practice session.

EXPLANATION OF REFERENCE NUMERALS 1 orthodontic practice appliance
2, 2A, 2B upper orthodontic practice appliance
3 lower orthodontic practice appliance
4a upper holding frame
4b lower holding frame
5 horizontal axle
21 support part
22, 22B orthodontic gingival part
23, 23B orthodontic tooth row
23a root part
23b crown part
24 metal plate (metal member)
27 opening
28 narrow portion
31 support part
32 orthodontic gingival part
33 orthodontic tooth row
34 metal plate
40B orthodontic practice unit

What is claimed is:

1. An orthodontic practice appliance comprising:
an orthodontic tooth row for orthodontic practice;
an orthodontic gingival part that holds the orthodontic tooth row, and is softened by application of heat; and
a metal member that is placed inside the orthodontic gingival part, and has an exposure portion exposed to the outside,
wherein the metal member extends in a direction parallel to the orthodontic tooth row.

2. The orthodontic practice appliance according to claim 1, further comprising a support part that supports the orthodontic gingival part.

3. The orthodontic practice appliance according to claim 2, wherein the orthodontic tooth row, the orthodontic gingival part, and the metal member are able to be removably attached to the support part.

4. The orthodontic practice appliance according to claim 1, wherein the metal member is placed along an arch of the orthodontic tooth row.

5. The orthodontic practice appliance according to claim 1, wherein the metal member extends from the exposure portion to near a root part of the orthodontic tooth row.

6. The orthodontic practice appliance according to claim 1, wherein the width of the metal member varies according to a length of the root part.

7. The orthodontic practice appliance according to claim 1, wherein the metal member includes two or more plate parts extending in a direction parallel to the orthodontic tooth row with a space with a predetermined width left between the plate parts.

8. The orthodontic practice appliance according to claim 7, wherein the two or more plate parts are formed by folding a sheet of a plate member into a U-shape.

9. The orthodontic practice appliance according to claim 1, wherein
the orthodontic practice appliance is an orthodontic practice appliance used when orthodontic correction is performed on part of a tooth row, and
the metal member is placed only on a portion corresponding to the tooth row subjected to the orthodontic correction.

10. The orthodontic practice appliance according to claim 1, wherein
the orthodontic practice appliance is an orthodontic practice appliance used when orthodontic correction is performed on part of a tooth row,
the metal member is placed to be along the entire tooth row, and
the width of a portion corresponding to a tooth row not subjected to the orthodontic correction is narrower than that of a portion corresponding to a tooth row subjected to the orthodontic correction.

* * * * *